United States Patent

Dudley

[15] 3,675,782
[45] July 11, 1972

[54] HANGER FOR SHEET MATERIAL

[72] Inventor: James M. Dudley, 2220 Southside Blvd., Jacksonville, Fla. 32216

[22] Filed: July 15, 1970

[21] Appl. No.: 54,992

[52] U.S. Cl. .................................211/50, 211/89, 24/244
[51] Int. Cl. ........................................................A47f 7/00
[58] Field of Search ................211/50, 89; 24/126 B, 136 A, 24/263 SW, 244

[56] References Cited

UNITED STATES PATENTS

| | | | |
|---|---|---|---|
| 3,168,954 | 2/1965 | Herrmann | 211/50 |
| 1,417,009 | 5/1922 | Woodward | 223/91 |
| 1,944,304 | 1/1934 | Scarnegie | 211/89 X |
| 2,590,297 | 3/1952 | Curtis | 211/89 X |
| 3,298,647 | 1/1967 | Shephard | 211/89 X |
| 3,399,429 | 9/1968 | Goodman | 211/50 X |
| 3,159,281 | 12/1964 | Hutter | 211/89 X |

*Primary Examiner*—Nile C. Byers, Jr.
*Attorney*—George H. Baldwin and Arthur G. Yeager

[57] ABSTRACT

A series of longitudinally aligned rollers or balls lie in an elongated hanger housing between a pair of caging walls and overlie a bottom opening in the housing formed by the spacing of such walls. The rollers or balls are interconnected by portions of a connecting means such as a plurality of pins passing respectively into bores of adjacent rollers for example, or a flexible string or wire passing through bores in such balls or rollers. The balls and rollers while thus interconnected may move limited distances independently of one another. A selective magnetic means independently or simultaneously moves such balls and rollers to release sheet material held thereby. The hanger may be rotated to cause release of sheet material held by the gripping balls or rollers.

26 Claims, 11 Drawing Figures

PATENTED JUL 11 1972 3,675,782
SHEET 1 OF 2
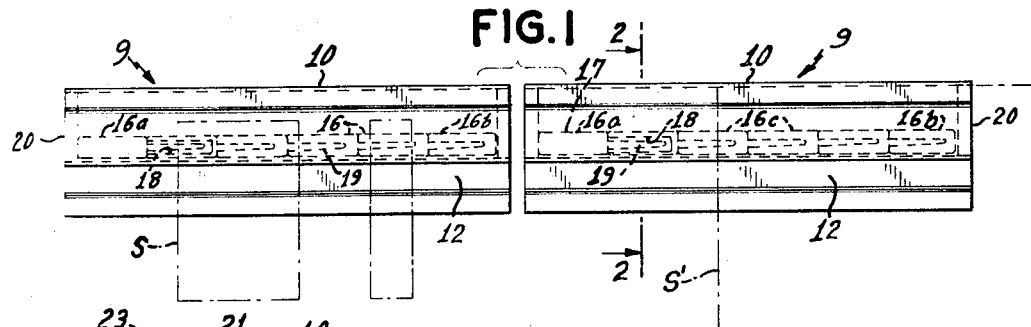
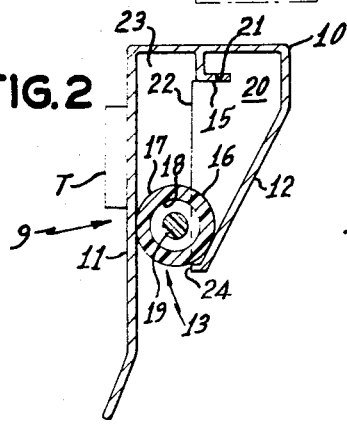
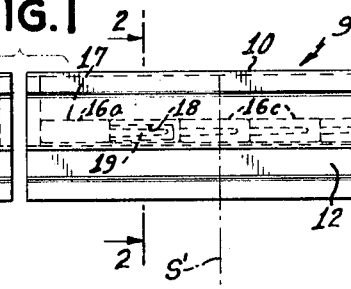
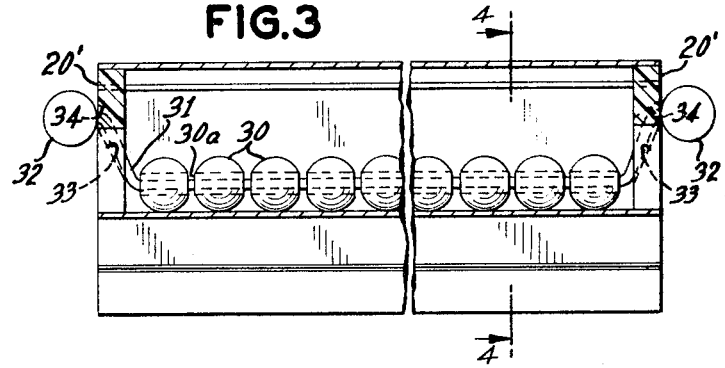
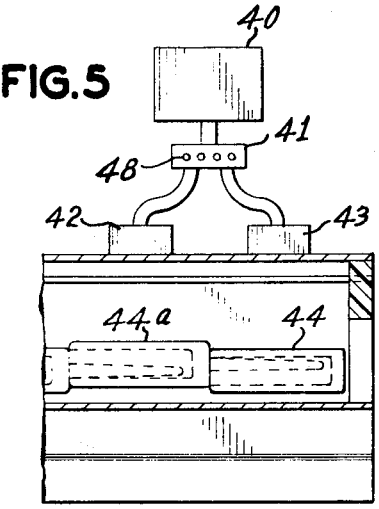
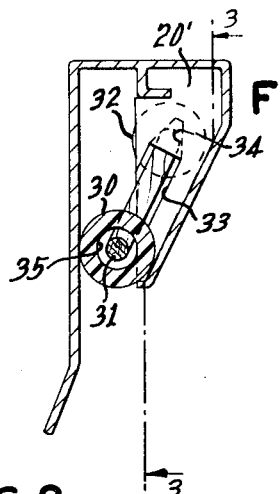
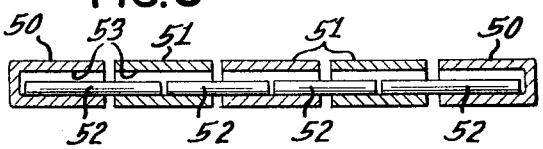
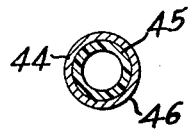
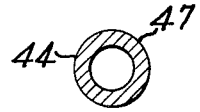
INVENTOR
James M. Dudley
BY
George H. Baldwin
ATTORNEY

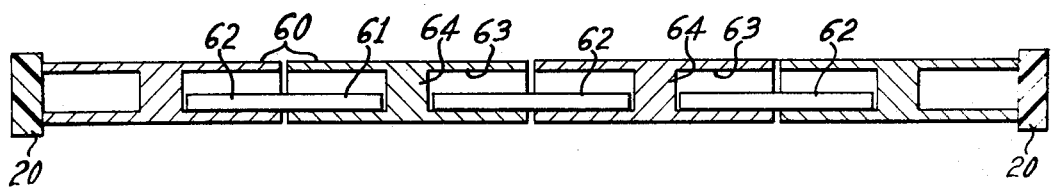
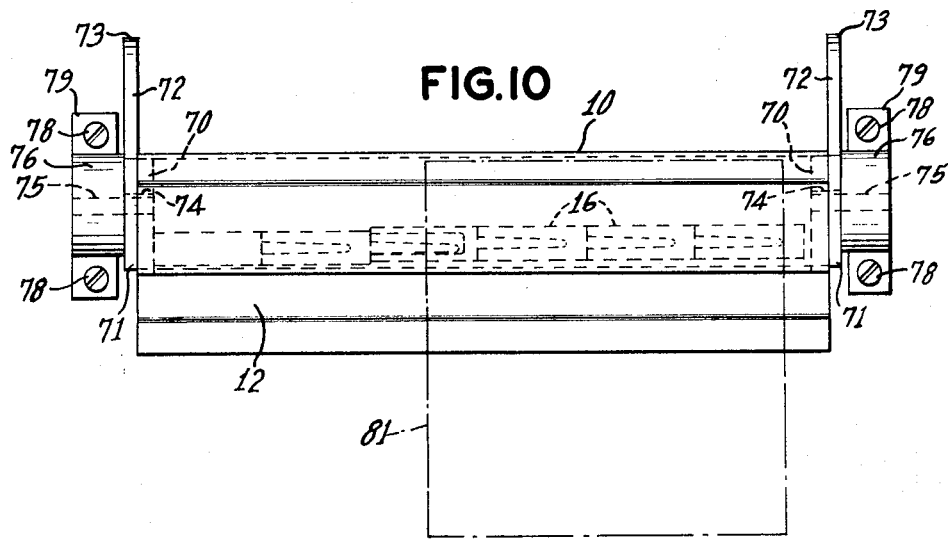
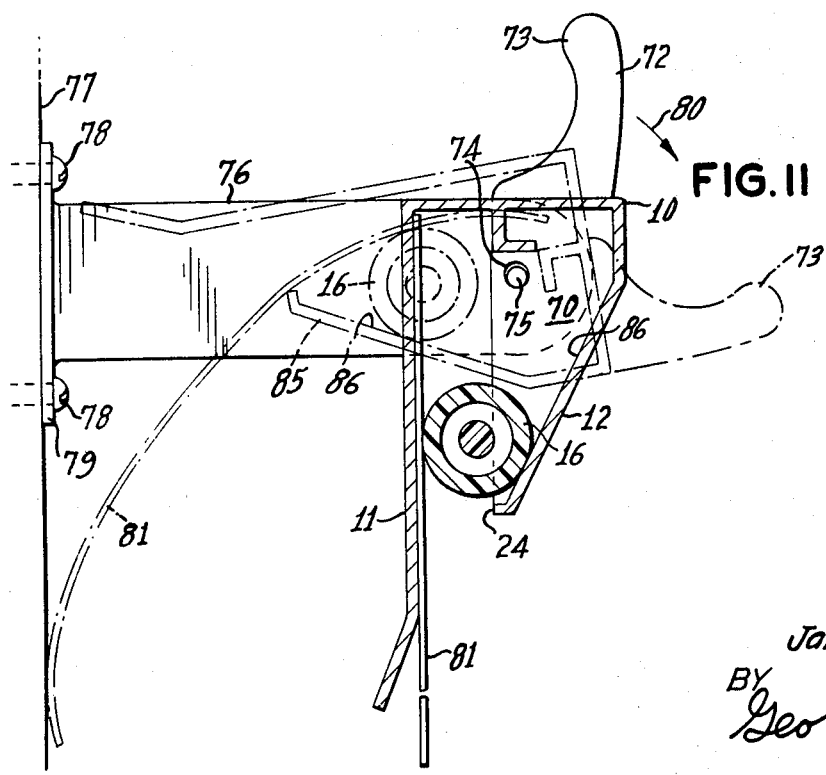

HANGER FOR SHEET MATERIAL

BACKGROUND OF THE INVENTION

1. Field of the Invention

This invention relates to a hanger for sheet material, and particularly, a hanger of the type that will accept and hang, sheet material of varying thickness. Even more particularly, the invention relates to a hanger in which a series of wedging pieces are contained within a housing, and are adapted to grasp and hold several sheets of material that will then hang from the housing.

2. Description of the Prior Art

Hangers of the class to which this invention relates are very old in the art, and numerous patents have issued covering various constructions, exemplary of which are U.S. Pat. Nos. 446,486; 1,179,003; 1,233,506; 1,257,406; 1,417,009; 1,479,243; 1,857,724; 2,521,604; 3,063,569; 3,294,350; 3,309,052 and 3,399,429; and foreign Pat. Nos. France, 8/1928, 648,732; Italy, 4/1934, 316,338; Great Britain, 12/1937, 477,102; Germany, 6/1952, 842,634; and Austria, 5/1958, 197,609. There is considerable demand for a truly effective hanger for flexible sheet material, and for that reason many inventors have been attracted to the art. An interesting patent covering a construction of the type set forth in this application was issued in Feb. 9, 1965, U.S. Pat. No. 3,168,954. In this patent, it is disclosed that a series of wedging pieces overlie an opening formed in the bottom of an elongated housing, the wedging pieces lying between two generally vertical walls, and being adapted to wedge against sheet material inserted against one wall. The above patent utilizes a series of longitudinally aligned wedging rollers, and was particularly concerned with preventing these rollers from jamming or becoming dislodged. In the above patent a description of an earlier Swiss Pat. No. 278,129 issued on Jan. 3, 1952, is given, and in this Swiss patent it is disclosed that a long pin traverses bores in a series of wedging rollers for interconnecting the rollers, the lifting of the pin being adapted to release all of the wedging rollers at once. The above U. S. patent further describes the Swiss patent in that when one of the rollers in the Swiss patent is moved to release one sheet of flexible material, it may and probably will effect the release of other sheets held by other rollers. The U. S. patent does not state specifically how this action can take place, but an analysis of the Swiss patent shows that the releasing pin 4 rests by gravity on all of the rollers 3. Therefore, when any one roller moves upwardly, that one roller must move the pin 4 with it, and therefore move other wedging rollers upwardly. In any event, the U. S. patent desires to avoid the simultaneous release of rollers holding a plurality of sheets and such is an object of this invention.

The above U. S. patent therefore discarded completely the traversing, retaining and aligning pin of the above Swiss patent, and adopted instead a series of independent wedging pieces or rollers. In order to hold these wedging pieces against misalignment, the U. S. patent adopted a relatively complex and costly housing equipped with surfaces that limit movement of the wedging pieces. It is doubted however, that the U. S. patent construction is entirely satisfactory, since it appears that in the form of the invention in which balls are utilized as wedging pieces, the balls can have sufficient movement to wedge relative to one another into an inoperative position. It is also highly probable that the edges of the cylindrical rollers that the U. S. patent utilizes, will also wedge relatively to one another since it is practically impossible or very costly to make these rollers entirely smooth at their ends.

In the construction set forth in this application, it is believed that the advantages and improvements sought by the above U. S. patent are fully contributed, together with further features, while at the same time, the advantages of the above Swiss patent construction are also retained and enhanced.

SUMMARY OF THE INVENTION

A feature of the invention of this application resides in the utilization of connecting means for the several wedging pieces adapted to hold the wedging pieces in effective alignment relatively to one another, while permitting independent limited movement of each of the wedging pieces. For this purpose, the connecting means are formed so that only a portion of the connecting means is moved upon predetermined movement of another portion by one of the wedging pieces. Obviously, in the Swiss patent, which uses connecting means discarded by the U. S. patent, any movement of any wedging piece will move the entire connecting means. Such co-action is avoided in the hanger constructed in accord with this invention.

More particularly, as a feature of the invention, one modification thereof utilizes a series of wedging pieces, each of which has a pin or the like extending therefrom and adapted to lie within a bore formed in the adjacent or juxtaposed and aligned wedging piece. In this relationship, the connecting means for the wedging pieces may be considered as comprising a series of component parts. As a more particular feature of this embodiment of the invention, each of the pins is adapted to lie in spaced relation to the internal wall of each bore of the adjacent or juxtaposed wedging piece so that each wedging piece may move a predetermined limited distance relative to its adjacent wedging piece without contact between a bore defining surface and a pin or moving that wedging piece. Should a particular wedging piece move a greater distance than is permitted by the spacing between a pin and bore defining surface, then conceivably the adjacent wedging piece will also be moved if sufficient force is exerted thereagainst. However, such adjacent wedging piece will yieldingly resist such movement as is obvious from considerations hereinafter.

As a further feature of the invention, the connecting means may take the form of a string or wire or a ball chain traversing a series of bores in aligned wedging pieces formed as rollers or balls. Obviously the string or wire or ball chain may lie in spaced relation to the walls of the internal bores of the rollers or ball wedging pieces to permit some free movement of the wedging pieces relatively to one another. Thus, only a portion of the connecting means will move when a wedging piece moves sufficiently to move such portion. However, the wedging pieces will all be retained in effective aligned position, and no jamming or misalignment may occur. Therefore, in this embodiment, as in the first embodiment set forth, all of the advantages of the above Swiss patent are retained, including the simultaneous release of all the wedging pieces, as well as the advantages set forth in the above U. S. patent.

In a further form of the invention, a series of aligned rollers forming the wedging pieces, are held in position by a series of pins lying in the bores of the rollers, with each pin lying partially in the bore of each of two adjacent or juxtaposed rollers. In this form of the invention, relatively full freedom of movement of any particular roller is possible, while at the same time, all of the rollers are maintained aligned. Further, the pins are adapted, through their weight, to exert some force effect on the rollers tending to hold the rollers in wedging position, and such action may be desired when some types of sheet material are to be hung from the hanger of the invention.

In a still further form of the invention, the wedging pieces are a series of balls, which may be held effectively in position by a connecting means in the form of a cord, chain or wire, and may be effectively moved to release position by the connecting means whenever required, by a simple pull on one or both ends of the cord, chain or wire.

It will be appreciated further, that the utilization of a cord, wire or chain makes possible the assembly of the several wedging pieces so that they may be readily moved into position within the housing of the invention, thereby simplifying the assembly procedure.

A further form of the invention contributes magnetic means for releasing one or more of the wedging pieces, selectively or simultaneously. Thus, as a feature of this embodiment, the wedging pieces are made magnetically responsive, so that they may be moved to a release position by any one of the series of electromagnets that may be fixed opposite particular wedging pieces, so that when excited, the wedging pieces are moved to release the sheet material held thereby.

As a still further feature of the invention, the ends of the housing are effectively closed to retain the wedging pieces while allowing the entrance of part of a piece of sheet material into the housing as another aligned part of the sheet material is outside the housing.

It may be said generally, that the hanger construction of this invention contributes wedging means in a housing of the class described, in which the wedging means comprise wedging pieces that are readily movable independently of one another, and yet are held in an interconnected relationship so that they cannot be jammed or otherwise rendered ineffective. More specifically, the invention contributes means for varying readily the amount of pressure to be exerted against each of the several wedging pieces to hold the wedging pieces in effective position, and a housing for the wedging pieces that is simple and relatively low in cost, since it does not require complex configurations of some of the prior art. The invention also contributes a simple and effective means for releasing the wedging pieces in predetermined order or as a group, as may be required.

BRIEF DESCRIPTION OF THE DRAWINGS

The novel features that are believed to be characteristic of this invention are set forth with particularity in the appended claims. The invention itself, however, both as to its organization and method of operation, together with further objects and advantages thereof may best be understood by reference to the following description taken in connection with the accompanying drawings, in which:

FIG. 1 is a front elevational view of two juxtaposed hangers constructed and utilized in accord with this invention;

FIG. 2 is a sectional view taken along line 2—2 of FIG. 1;

FIG. 3 is a front elevational view, partly in section, illustrating a modification of the invention in which the wedging pieces are balls, and the connecting means is in the form of a string or wire or ball chain;

FIG. 4 is a sectional view taken along line 4—4 of FIG. 3;

FIG. 5 is a partial front elevational view, partly in section, of a modification of the invention in which the wedging pieces are controlled by electromagnets;

FIGS. 6 and 7 show sections of magnetically responsive wedging pieces employed in FIG. 5;

FIG. 8 shows an assembly of a series of wedging pieces functioning in combination with connecting means in the form of pins lying in bores of the wedging pieces;

FIG. 9 shows another assembly of a series of wedging pieces functioning in combination with connecting means in the form of pins lying in bores of the wedging pieces;

FIG. 10 is a front elevational view of another embodiment of the hanger in accord with this invention; and FIG. 11 is an enlarged and elevational view, partially in section, of the hanger of FIG. 10.

DESCRIPTION OF THE PREFERRED EMBODIMENTS

Referring now to FIGS. 1 and 2, reference numeral 10 indicates generally an elongated housing utilized in the hanger 9 of this invention. This housing may take a very simple form, it being merely necessary that the housing have a rear wall 11, as best illustrated in FIG. 2, and a forward wall 12, with at least one wall tapering toward the other to form a bottom opening 13. Over this bottom opening 13 a series of wedging pieces, generally indicated by reference numeral 16, lie longitudinally aligned for effectively closing the opening as is particularly well shown in FIG. 2. For a purpose to be indicated presently, the housing 10 is preferably formed as an extrusion in order to embody a hook shaped longitudinal wall 15.

In the embodiment illustrated in FIGS. 1 and 2, certain of the wedging pieces 16 for convenience are noted by reference numerals 16a, 16b and 16c. Wedging pieces 16a and 16c are in the form of a sleeve 17 having an internal bore 18, with a pin 19 extending from the closed end of the sleeve 17. Each pin 19 lies in the bore 18 of the next sleeve 17, except that the wedging piece 16a, being at the left hand end, will naturally not have a pin 19 in its bore 18. The right hand end wedging piece 16b is a short piece not having a pin portion similar to pin 19, but having only a sleeve portion 17 which is fitted about the pin 19 of the wedging piece 16c immediately to the left thereof. Once the wedging pieces 16 are all inserted into the internal opening of the housing 10, and allowed to rest in the position shown in FIG. 2, a plug 20 is utilized for closing each end of the housing 10. This plug 20 may be in the form of a piece of plastic slotted at 21 to accommodate the hook shaped portion 15 of the housing, as well seen in FIG. 2. Obviously, two plugs 20, one at each end of the housing 10 will retain the several wedging pieces 16 in the housing.

It will be obvious in FIG. 2 that the wedging pieces 16 are greater in width than bottom opening 13 and will effectively close such opening 13. It is apparent that because each pin 19 is considerably smaller than each bore 18, each of the wedging pieces will have a predetermined freedom of individual movement prior to contacting an integral or shoulder portion of another wedging piece. Thus, if the pin 19 of one wedging piece is moved upwardly, it will move freely of the next wedging piece until it encounters the internal surface of a bore 18. On the other hand, if a sleeve portion 17 of a wedging piece moves upwardly, it will have some freedom of movement before it encounters the pin portion 19 of the next adjacent wedging piece. Therefore, each wedging piece has some independent freedom of movement, and differs from some of the prior art where any wedging piece that moves, must move the inter-connecting means between the pieces which in turn moves other pieces on such inter-connecting means.

As a further feature of the invention, it will be noted that the wall 12 has a lip 24 which assists in preventing the rollers, forming the wedging pieces 16 from wedging in a downward position overly extended into bottom opening 13. It will also be apparent that any movement of a sheet of flexible material into the housing 10 along wall 11, as for instance the sheet S in FIG. 1, will effect movement of three wedging pieces 16 upwardly, after which the wedging pieces will move downwardly into wedging position and will hold the sheet S against movement out of the housing. It is thus seen that two or more of the wedging pieces may coact with a single sheet of material, due to the effective freedom of movement of the wedging pieces. In addition, it will be noted that because of the positioning of the plugs 20 as shown in FIG. 2, with wall 22 of plug 20 spaced from wall 11 of housing 10, the plugs will not interfere with the movement of sheet material into the position illustrated by sheet S' in FIG. 1, where the upper part of the sheet S' lies partially within the housing 10 and partially outside the housing 10. It is apparent that the internal opening of the housing 10 communicates with the outside of the housing through the free spaces 23 between the walls 22 of plugs 20 and the rear wall 11 of the housing and that a sheet could be held by wedging pieces of two adjacent hangers, because of the uninterrupted communicating free spaces 23 of adjacent hangers. Also, the space indicated between adjacent hangers 9 need not be present so that hangers 9 may appear to be and function as a continuous hanger rather than two separate hangers 9, if desired. The housing 10 may be positioned on a wall or window or on any other type of structure, by any suitable means, but it is preferred to use a pressure sensitive two sided tape or the like, as designated by reference letter T in FIG. 2.

Referring now more particularly to FIG. 3, the wedging elements are in the form of bored balls 30 that are flatened at 30a so that they may lie in relatively juxtaposed position. These balls are assembled to one another on a string or wire or even a ball type chain 31, having a knob 32 at each end thereof.

The plugs 20' used in connection with the modification of FIGS. 3 and 4 are similar to plugs 20 and include slots 33 terminating in wedging passages 34 in which the string or wire or chain 31 may wedge so as to hold the connecting chain in an effective position. Preferably, the position of the chain 31 is such that it will lie generally centrally of each of the bores 35 of the several balls 30 constituting the wedging pieces. Because of this construction, each of the ball wedging pieces will have that freedom of motion described in connection with the embodiment of FIGS. 1 and 2. Of course, the chain may readily be adjusted so that the amount of free movement of any ball wedge relative to another ball will be relatively more limited, and all freedom of movement may be eliminated. Also, it is obvious that by pulling on the two knobs 32, or one knob while the other knob is retained in position, all of the wedging balls may be withdrawn from wedging relation to the flexible sheet material, or only some of the wedging balls adjacent one or another end may release a sheet material upon controlled and slight movement of one or another of the knobs 32.

It will also be apparent that in the embodiments of FIGS. 1, 2, 3, and 4, it is possible to utilize any number of wedging pieces that are required. It will further be obvious also, that while the chain or string construction shown in connection with FIGS. 3 and 4 is used for controlling ball type wedging pieces, it may be used in connection with cylinder or sleeve wedging pieces 51 illustrated in FIG. 8, if desired without departing from the spirit or scope of the invention.

Referring now to FIGS. 5, 6 and 7, there is illustrated at 40 a power source, and at 41 a selective switching device for controlling the flow of power to any one of the series of electromagnets 42 and 43, it being obvious that there will be an electromagnet in this embodiment opposite each one of the wedging pieces designated by reference numeral 44, 44a, if desired or one electromagnet may control two wedging pieces. In FIG. 6, the wedging piece 44 is shown as formed of plastic 45 with a metallic magnetic responsive coating 46. In FIG. 7 the wedging piece is entirely of metal as designated by reference numeral 47. Obviously, upon movement of a switch button 48 in the control 41, it is possible to energize any one of the electromagnets 42, 43. In FIG. 5 electromagnet 42 has been shown as energized to lift the roller 44a to release the sheet held thereby. If desired a permanent magnet may be employed to selectively cause release by a single wedging piece or all of the wedging pieces simultaneously. For example, a small permanent magnet may be selectively positioned above pieces 44a or 44 rather than electromagnets 42 or 43 or one long bar magnet may be positioned over all of the wedging pieces to cause same to simultaneously move upwardly thereby releasing all of the sheet material being held thereby.

In FIG. 8 there is illustrated a further embodiment of the invention wherein each of the end wedging pieces or rollers is designated by reference numeral 50, while each of three medial wedging pieces or rollers is designated by reference numeral 51. Each of the wedging pieces 50 is preferably closed at one end, or some stop, similar to end plugs 20, must be provided in the housing, or otherwise to prevent dislodgment of pins 52 from end sleeves 50, while each wedging piece 51 is in the form of a through sleeve as shown. The connecting means in the modification of FIG. 8 takes the form of pins 52 which are placed end to end within adjacent bores 53 of two adjacent wedging pieces 50 and 51, or between sleeve pieces 51.

Therefore, in the modification of FIG. 8, each of the pins 52 acts as a connecting means, that permits relatively free movement, within desired limits, of the wedging pieces relatively to one another. Also, the thickness or diameter of the pins 52 is greater than one-half of the diameter or vertical and/or horizontal dimension of bore 53 to insure no overlapping of adjacent pins 52 within bores 53. It will also be noted further, that each of the pins 52, through its weight, will exert pressure on the wedging pieces to hold them in effective relation to the sheet material to be held by the pieces. As was earlier indicated, the string or ball chain or wire of the embodiment of FIGS. 3 and 4 may be utilized substantially in the same manner as the pins 52. Thus, the chain 31 of the embodiment of FIG. 3 could readily lie in the position of the pins 52 if desired.

In FIG. 9 another embodiment of the invention is illustrated wherein each of the wedging pieces or rollers is designated by reference numeral 60 with the connecting means 61 being a series of pins 62 lying within bores 63 of adjacent rollers 60. Contrary to the embodiment of FIG. 8, the thickness or diameter of the pins 62 is not critical with respect to the diameter of bores 63 in that baffles 64 separate adjacent pins 61 and no overlapping of pins 61 is present in this embodiment of the invention. The rollers 60 with pins 62 are maintained in proper position within the housing by end plugs 20, as previously described in connection with FIGS. 1 and 2. In this embodiment it is seen that each of the wedging pieces 60 is identical, and as previously described each of the wedging pieces 50 may be identical to wedging pieces 51 when plugs similar to plugs 20 are used in the embodiment of FIG. 8.

Another embodiment of the invention is disclosed in FIG. 10 and 11 wherein the housing 10 and roller arrangement may be in the form of any of the embodiments shown in FIGS. 1, 3, 8 or 9. However, the end plugs 70, unlike end plugs 20 previously described, include a lateral extension 71 having an upwardly extending portion 72 in the form of a handle 73. An opening 74 in each end plug 70 receives a horizontal pin 75 affixed to a bracket 76, bracket 76 being affixed to, for example, a vertical support 77 by screws 78 or the like extending through flanges 79 integral with bracket 76.

Upon grasping of one or both of the handles 73 and movement preferably in a clockwise direction as indicated by arrow 80, the hanger housing 10 and sheet material 81 held by rollers 16 will be rotated about the horizontal axis formed by pins 75 to at least the broken line position indicated at 85 or until the rollers 16 no longer exert a sufficient gripping pressure on sheet material 81 thereby releasing such sheet material from the hanger. In normal releasing operation of hanger, the rollers 16 will ride down the inclined inner surface 86 of front wall 12 after release of sheet material 81. Furthermore, when the sheet material 81 engages the vertical support 77, as shown by the broken lines, during rotation of the hanger about pins 75, a force will be exerted downwardly on the sheet material 81 which assists in the releasing of the sheet material from the gripping action of the rollers 16 without pulling action by an operator's hand or the like on the sheet material.

This embodiment as illustrated in FIGS. 10 and 11 may be mounted on a continuous conveyor or the like and a tripping device to engage one or both handles 73 may automatically cause the hanger to rotate thereby automatically releasing the sheet material thereat, which would readily occur to persons skilled in the art.

While the invention has now been described with respect to certain specific embodiments, it will be appreciated that many modifications and changes may be made by those skilled in the art without departing from the spirit of the invention. It is intended, therefore, by the appended claims to cover all such modifications and changes as fall within the true spirit and scope of the invention.

What is claimed as new and what it is desired to secure by Letters Patent of the United States is:

1. In a hanger for sheet material comprising an elongated housing adapted for horizontal mounting and having an internal longitudinal passageway defined by front and rear spaced longitudinal internal walls with one such wall diverging angularly upwardly with respect to the other wall from a bottom opening formed by the spacing of the lower edges of said walls and into which said opening sheet material is to be inserted, separate wedging pieces lying longitudinally aligned in said housing over said bottom opening and between said walls in a position to exert independent wedging pressure against sheet material inserted into said housing through said bottom opening, the improvement comprising connecting means for said separate wedging pieces formed of relatively movable portions for yieldingly holding said wedging pieces in effective alignment relatively to one another while permitting independent limited movement of said wedging pieces in directions toward and away from said bottom opening, one of said portions connecting one of said wedging pieces being adapted to be moved relatively to another of said portions connecting another of said wedging pieces upon movement of said one wedging piece by insertion of sheet material in contact with said one wedging piece, each pair of adjacent said wedging pieces being movable independently of each other in different directions and said movable portions connecting the said pieces of each pair of adjacent pieces being movable with movement of either such piece of each such pair in said different directions.

2. In the hanger as defined in claim 1, wherein said connecting means is universally flexible whereby adjacent portions thereof are independently movable in different directions.

3. In the hanger as defined in claim 1, wherein said wedging pieces include respective bores, and said connecting means includes a plurality of pins extending between said bores in adjacent said wedging pieces.

4. In the hanger as defined in claim 1, wherein each of said wedging pieces independently yieldingly resists movement of a portion of said connecting means as another portion of said connecting means is moved by an adjacent wedging piece.

5. In the hanger as defined in claim 4 wherein said wedging pieces include respective bores extending completely therethrough.

6. In the hanger as defined in claim 5 wherein said wedging pieces include respective bores with baffles generally midway of said wedging pieces, each of said pins extending from adjacent one said baffle of one of said wedging pieces to adjacent another said baffle of another of said wedging pieces of juxtaposed said wedging pieces.

7. In the combination as defined in claim 1, wherein said housing is closed at one end by a plug to inhibit outward movement of said wedging pieces therefrom, said plug being spaced from one of the internal walls of said housing adapted to permit movement of part of a sheet of material into the space therebetween as part of said sheet is outwardly of said housing.

8. In the hanger as defined in claim 1, wherein said wedging pieces include respective bores, and said connecting means includes a flexible member traversing said bores in said wedging pieces.

9. In the combination as defined in claim 8, wherein said bores are of sufficient size relatively to said flexible member so that when said wedging pieces rest over said bottom opening the internal surfaces constituting said bores are spaced from said flexible member.

10. In the hanger as defined in claim 8, wherein said wedging pieces are balls having bores therein.

11. In the hanger as defined in claim 8 wherein said wedging pieces are cylinders having bores therein extending longitudinally thereof.

12. In the hanger as defined in claim 1, wherein said wedging pieces include respective bores, and said connecting means includes a plurality of pins lying in said bores in said wedging pieces.

13. In the combination as defined in claim 12, wherein said bores are of sufficient size relative to said pins so that when said wedging pieces rest over said bottom opening the internal surfaces constituting said bores are spaced from said pins.

14. In the hanger as defined in claim 1, wherein said wedging pieces include magnetic responsive elements, and magnetic means for coacting with said elements to move said wedging pieces upwardly from said bottom opening.

15. In the hanger as defined in claim 14 wherein said magnetic means includes selective means for independently moving respective said wedging pieces.

16. In the hanger as defined in claim 1, wherein one said wedging piece includes a bore, and said connecting means includes a pin on another adjacent said wedging piece lying in said bore of said one wedging piece.

17. In the hanger as defined in claim 16 wherein said bore is larger than said pin thereby loosely retaining said pin within said bore and permitting relative limited movement therebetween.

18. In the hanger as defined in claim 1, wherein said wedging pieces comprise small cylinders formed with a central longitudinal bore and a pin extending from one end of said cylinder into said bore of each of adjacent and aligned said cylinder, said pins and bores constituting said connecting means.

19. In the hanger as defined in claim 18, wherein said bores are of sufficient size relatively to said pins so that when said wedging pieces rest over said bottom opening the internal surfaces constituting said bores are spaced from said pins.

20. In the hanger as defined in claim 1 further comprising means for mounting said housing about an axis extending generally longitudinally thereof, said housing being adapted and arranged to be swung about said axis whereby to move said wedging pieces away from said bottom opening causing said wedging pieces to release any sheet material being held thereby.

21. In a hanger for sheet material comprising a housing having a wall and a bottom opening for insertion of sheet material thereinto, a wedging piece in said housing for exerting wedging pressure against sheet material inserted between said wedging piece and said wall of said housing, the improvement wherein said wedging piece includes a magnetically responsive means, and magnetic means for coacting with said magnetically responsive means to move said wedging piece away from said bottom opening thereby to release sheet material held between said wedging piece and said wall.

22. In the hanger as defined in claim 21 further comprising another wedging piece including a magnetically responsive means, said magnetic means includes selective means for independently moving said wedging pieces.

23. In a hanger for sheet material comprising a housing having a wall and a bottom opening for insertion of sheet material thereinto, a wedging piece in said housing for exerting wedging pressure against sheet material inserted between said wedging piece and said wall of said housing, the improvement comprising means for mounting said housing about a generally horizontal axis, said housing being adapted and arranged to be swung about said axis whereby to move said wedging piece away from said bottom opening causing said wedging piece to release any sheet material held thereby.

24. In the hanger as defined in claim 23 wherein said housing is elongated generally in the horizontal direction, further comprising another wedging piece adjacent said wedging piece, connecting means for said wedging pieces formed of relatively movable portions for yieldingly holding said wedging pieces in effective alignment relative to one another while permitting independent limited movement of said wedging pieces in directions toward and away from said bottom opening.

25. In the hanger as defined in claim 23 wherein said housing includes an open end, means for plugging said open end to inhibit outward movement of said wedging piece therefrom, said means including a handle extending outwardly of said housing adapted to be engaged for movement of said housing about said axis.

26. In the hanger as defined in claim 23 wherein said means for mounting said housing includes a pair of elongated brackets adapted to be attached to a support, means for connecting said housing to said brackets adjacent each end of said housing, said brackets being sufficiently elongated to permit complete rotation of said housing about said axis.

* * * * *

75